US009007895B2

(12) United States Patent
Schlansker et al.

(10) Patent No.: US 9,007,895 B2
(45) Date of Patent: Apr. 14, 2015

(54) METHOD FOR ROUTING DATA PACKETS IN A FAT TREE NETWORK

(75) Inventors: Michael Schlansker, Los Altos, CA (US); Jean Tourrilhes, Mountain View, CA (US); Yoshio Turner, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 171 days.

(21) Appl. No.: 13/643,281

(22) PCT Filed: Apr. 30, 2010

(86) PCT No.: PCT/US2010/033258
§ 371 (c)(1),
(2), (4) Date: Oct. 24, 2012

(87) PCT Pub. No.: WO2011/136807
PCT Pub. Date: Nov. 3, 2011

(65) Prior Publication Data
US 2013/0039169 A1     Feb. 14, 2013

(51) Int. Cl.
*H04L 12/00*     (2006.01)
*H04L 12/28*     (2006.01)
*H04J 14/00*     (2006.01)
*H04K 1/00*      (2006.01)
*H04L 12/753*    (2013.01)
*H04L 12/715*    (2013.01)
*H04L 12/707*    (2013.01)
*H04L 12/703*    (2013.01)
*H04L 12/741*    (2013.01)

(52) U.S. Cl.
CPC ............. *H04L 45/48* (2013.01); *H04L 45/04* (2013.01); *H04L 45/24* (2013.01); *H04L 45/28* (2013.01); *H04L 45/745* (2013.01)

(58) Field of Classification Search
CPC ...................................................... H04L 45/28
USPC .................... 370/225, 389; 398/49; 380/29
See application file for complete search history.

(56) References Cited

U.S. PATENT DOCUMENTS

| | | | |
|---|---|---|---|
| 6,519,062 B1 * | 2/2003 | Yoo | 398/49 |
| 2005/0213582 A1 | 9/2005 | Wakumoto et al. | |
| 2008/0192925 A1 * | 8/2008 | Sachs et al. | 380/29 |
| 2008/0205387 A1 * | 8/2008 | Wakumoto | 370/389 |
| 2008/0285562 A1 | 11/2008 | Scott et al. | |
| 2009/0028172 A1 | 1/2009 | Scott et al. | |
| 2009/0292855 A1 | 11/2009 | Scott et al. | |
| 2010/0020806 A1 | 1/2010 | Vahdat et al. | |

OTHER PUBLICATIONS

International Search Report, PCT/US2010/033258, Jan. 4, 2011, 11 pages.

(Continued)

*Primary Examiner* — Kiet Tang

(57) ABSTRACT

In a method (400) for routing packets between a plurality of top switches (110a-110n) and a plurality of leaf switches (120a-120n) using a balancing table (204, 208, 210) in a fat tree network (100), a failed link between at least one top switch (110n) and at least one leaf switch (120n) is detected (402). In addition, the balancing table (204, 208, 210) is modified (406) based on the detected failed link, and the packets are routed (408) between the plurality of top switches (110a-110n) and the plurality of leaf switches (120a-120n) in the fat tree network (100) based on the modified balancing table (204, 208, 210).

12 Claims, 7 Drawing Sheets

(56) References Cited

OTHER PUBLICATIONS

M. Schlansker et al. "Killer Fabrics for Scalable Datacenters", HP technical report, HPL-2009-26. Feb. 6, 2009.

R. Mysore et al. "PortLand: A Scalable Fault-Tolerant Layer 2 Data Center Network Fabric", SIGCOMM 09, Aug. 17, 2009.

Taiwan Patent Office, 'Search Report on TW Application No. 100115092', dated Aug. 15, 2013, 3 pages.

* cited by examiner

METHOD FOR ROUTING DATA PACKETS IN A FAT TREE NETWORK

RELATED APPLICATION

The present application contains some common subject matter with U.S. patent application Ser. No. 12/770,978, entitled "METHOD FOR ROUTING DATA PACKETS USING VLANS", filed on Apr. 30, 2010 by Michael Schlansker, Jean Tourrilhes, and Yoshio Turner, the disclosure of which is incorporated by reference in its entirety and attached here as an attachment "A."

BACKGROUND

Ethernet switching technology provides high bandwidth, low latency, and scalability for large datacenters and computers for data communication. A number of approaches have been used to exploit multiple paths in an Ethernet. For example, the network can be partitioned using layer-three Internet Protocol (IP) subnets or layer-two Virtual Local Area Networks (VLANs). Although these approaches limit the scope of flat layer two networks and assist in exploiting multiple paths, complex and costly manual administration are still required.

Another protocol developed to enhance Ethernet networks is hash-based routing based on fat trees. Fat trees are constructed in tiers to allow switches of fixed radix to scale to networks of arbitrary size and bisection bandwidth. When a message flows from a source to a destination, a sequence of multiple uplink choices are confronted until a root switch is reached. These techniques provide load balancing for multi-path networks while preserving the simple administration of plug and play networks, which results from the learning functions of transparent bridging. However, a critical problem for hash-based routing occurs when one or more links or switches fail, which disrupts normal network communications. Unlike a regular tree, which includes only a single top switch, the fat-tree structure includes a larger number of uplinks and top switches. Therefore, the probability of failure in the fat-tree structure is increased.

BRIEF DESCRIPTION OF THE DRAWINGS

Features of the present invention will become apparent to those skilled in the art from the following description with reference to the figures, in which.

DETAILED DESCRIPTION

Figure 1:
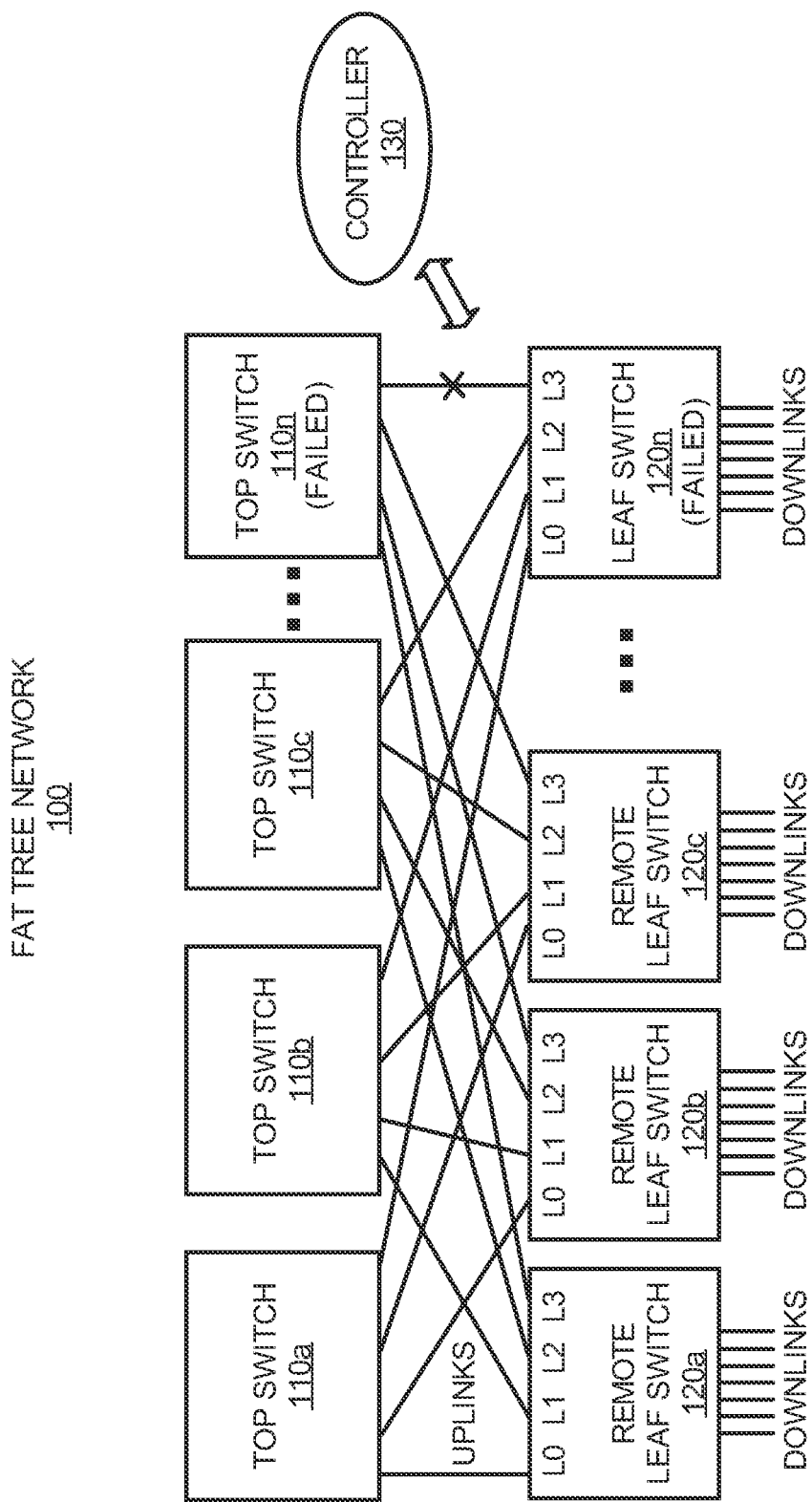
FIG. 1 shows a diagram of a fat tree network, according to an example embodiment of the present invention.

For simplicity and illustrative purposes, the present invention is described by referring mainly to an example embodiment thereof. In the following description, numerous specific details are set forth to provide a thorough understanding of the embodiments. However, it will be apparent to one of ordinary skill in the art that the present invention may be practiced without limitation to these specific details. In other instances, well known methods and structures have not been described in detail to avoid unnecessarily obscuring the description of the embodiments.

Disclosed herein are a method and controller for routing packets between a top switch and a leaf switch in a fat tree network. More particularly, the controller and method disclosed herein are configured to route packets via multiple uplinks between a plurality of top switches and a plurality of leaf switches using hash-based routing tables, such as a ternary content addressable memory (TCAM) table, in a fat tree network. In addition, and as discussed in greater detail herein below, the hash-based routing tables may be modified in various manners to accommodate for failed links between the top switches and the leaf switches. In addition, the packets may be routed between the plurality of top switches and the plurality of leaf switches in the fat tree network according to the modified hash-based routing tables in order to minimize disruption in the communication of packets in the fat tree network.

Through implementation of the method and controller disclosed herein, a failed link between the top switches and the leaf switches may automatically be determined. The method and controller disclosed herein enable all remaining operational links and switches to carry traffic without unnecessarily disabling any top or leaf switch. As such, the method and controller disclosed herein enable for a packet route having a failed uplink or a failed switch to be tolerated in a relatively quick and efficient manner.

As discussed herein, a packet may be a data packet and a stream of data packets carries information needed for communication flows that transport information streams over a network between sending and receiving devices. Examples of types of packet streams are multiplayer game data, streaming video or audio, or bulk transfer of data. The source and destination devices are configured to send or receive packets via a route in a network and packets may pass through the route to the destination device through the network or through another network.

One end of an uplink is connected to a top switch and the other end of the uplink is connected to a leaf switch in a fat tree network. More than one uplink may be connected to a top switch and a leaf switch. One or more down links may also be connected to a leaf switch in a fat tree network. Multilayer switches in a fat tree network deploy memory tables using specialized memory architectures, such as a balancing table. A particular example of a suitable balancing is a ternary content addressable memory (TCAM) table, which is an example of a hash-based routing table to distribute traffic across the top switches.

A hash function assigns messages to randomly selected hash classes. For each source address "s" and each destination address "d," H(s, d) represents the hash class for every message sent from s to d. This hash may incorporate layer two and higher layer information. Symmetric hashes have H(s,d)=H (d,s). This ensures that the path may be retraced by a reply after a message flows from a source to any destination.

The methods described herein are not limited to be applied only to a fat tree network. The methods may also be applied to other wired or wireless networks, such as wired or wireless telecommunications networks, computer networks, or other types of networks.

With reference first to FIG. 1, there is shown a diagram of a fat tree network 100, according to an example. It should be clearly understood that the fat tree network 100 may include additional components and that some of the components described herein may be removed and/or modified without departing from a scope of the fat tree network. As such, the fat tree network 100 may include any number of top switches, leaf switches, uplinks, downlinks, source devices, and network devices. In addition, the fat tree network 100 may be connected to an access network or any wide area network (WAN) or other network.

The fat tree network 100 includes multiple top switches 110a-110n and multiple leaf switches 120a-120n. The fat tree network 100 also includes multiple uplinks. Each of the multiple uplinks connects one of the top switches 110a-110n to one of the leaf switches 120a-120n. In one embodiment, one of the top switches 110a-110n, for example, the top switch 110a, may be used for a spanning tree that interconnects the leaf switches 120a-120n. This spanning tree is adequate to support the addition or reconfiguration of additional Ethernet switches that might be attached to the leaf switches 120a-120n. The remaining top switches do not participate in the spanning tree protocol but provide additional redundant paths that may be used by hash-based routing to transport packets. In another embodiment, if the top switch 110a that supports the spanning tree protocol fails, a new spanning tree may be determined starting from another top switch among the remaining top switches.

The fat tree network 100 further includes multiple downlinks. The multiple downlinks are connected to the leaf switches 120a-120n as shown in FIG. 1. In addition, a controller 130 is configured to route packets between the top switches 110a-110n and the leaf switches 120a-120n through application of hash-based routing tables. As discussed in greater detail herein below, the controller 130 is configured to detect a failed link, to modify the hash-based routing tables to accommodate for the failed uplink, and to route packets between the top switches 110a-110n and the leaf switches 120a-120n according to the modified hash-based routing tables. In addition, the controller 130 may comprise a data center wide network controller or a more localized network controller.

As shown in FIG. 1, a link between the rightmost top switch 110n and the rightmost leaf switch 120n has been denoted with an "x" as having failed. A link may fail, for instance, if a port on either the top switch 110n or the leaf switch 120n fails or when the top switch 110n or the leaf switch 120n fails entirely. In addition, or alternatively, a link may fail if the cable connecting the ports of the top switch 110n and the leaf switch 120n becomes damaged or disconnected.

A link may also be considered as having failed when all of the physical links within a link aggregation group (LAG) fail. As discussed below, each physical link of a LAG connects a different leaf switch to a top switch that is attached to the LAG. In FIG. 1, the remaining leaf switches 120a-120c that are not attached to the failed link are considered as remote leaf switches. The top switch 110n that is directly attached to the failed link is considered as a failed top switch. Both the failed leaf switch 120n and the failed top switch 110n may be fully functional except for the broken link.

Figure 2A:
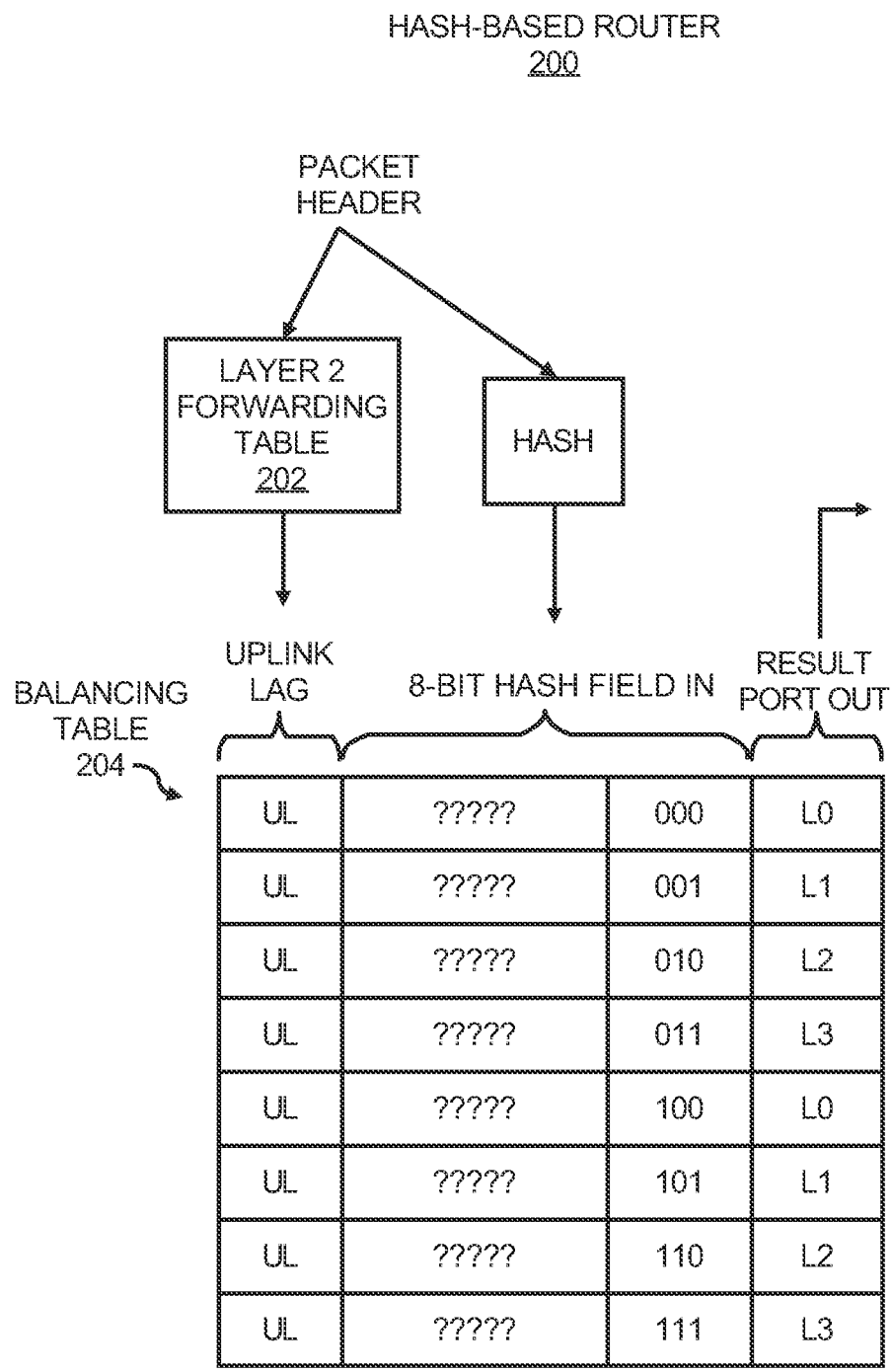
FIG. 2A shows a hash-based router for use in a fat tree network, according to an example embodiment of the present invention.

With reference now to FIG. 2A, there is shown a hash-based router 200 for use in a fat tree network, according to an example. It should be understood that the hash-based router 200 depicted in FIG. 2A is for illustrative purposes and should thus not be construed as limiting the invention in any respect.

Generally speaking, the controller 130 (FIG. 1) is configured to employ the hash-based router 200 in actively managing the routing of packets through the fat tree network 100 for balancing load among a number of the top switches 110a-110n. In other words, the controller 130 is configured to access a Layer two forwarding table 202 and a balancing table 204, which are collectively referred herein as hash-based routing tables, to route packets through the top switches 110a-110n in various manners to substantially prevent any one of the top switches 110a-110n from being overloaded and thereby decreasing the efficiency of the fat tree network 100. In addition, the controller 130 is configured to modify the balancing table 204 as discussed below to substantially maintain the load balancing among the top switches 110a-110n that remain active.

Each entry in the balancing table 204 contains a hash value field, a forwarding port field, and an actual port field. If the hash value and forwarding port fields match corresponding key fields, then the actual port field is substituted and determines the uplink. For each possible combination of hash bits (e.g., 256 combinations for an 8-bit hash field), there is one entry containing that constant in its hash value field. Each entry also provides an actual port field that specifies the desired uplink for the entry's hash value. The controller 130 may collect switch statistics to acquire datacenter-wide measurements for load balancing.

In accordance with the example shown in FIG. 1, the controller 130 uses the hash-based router 200 shown in FIG. 2A to route packets across the four top switches 110a-110n prior to detection of any faults, when the fat tree network 100 contains no broken links. A symmetric routing is assumed and, thus all of the switches 110a-110n and 120a-120n use the same Layer two forwarding table 202 and balancing table 204. In FIG. 2A, The Layer two forwarding table 202 in each switch contains an association between Ethernet addresses and the desired forwarding port for that address. For uplinks, the Layer two forwarding table 202 specifies the uplink virtual port indicating that one of the uplinks will be used to send the data through a top switch according to the result of a balancing table 204 construction. In one embodiment, the balancing table 204 entries may be created to uniformly distribute traffic across the four uplinks marked L0, L1, L2, and L3 out of each leaf switch 120a-120n. Uplinks having the same marking on each leaf switch reach the same top switch. Each packet's hash value and direct packets having specific hash values are matched to specific uplinks. For example, 8 bits of hash result may be calculated. However, the balancing table 204 entries may ignore 5 bits of hash result and match three low-order bits of the hash result with binary values: 000, 001, 010, 011, 100, 101, 110, and 111.

In one embodiment, a match operation selects, the output port that determines which top switch is used to transport a packet. For instance, eight hash classes may be mapped on the four uplinks in such a way that exactly two hash classes are mapped on every uplink. This hash mapping is symmetric, and identical hash-based routing tables are installed in every leaf switch 120a-120n.

Figure 2B:
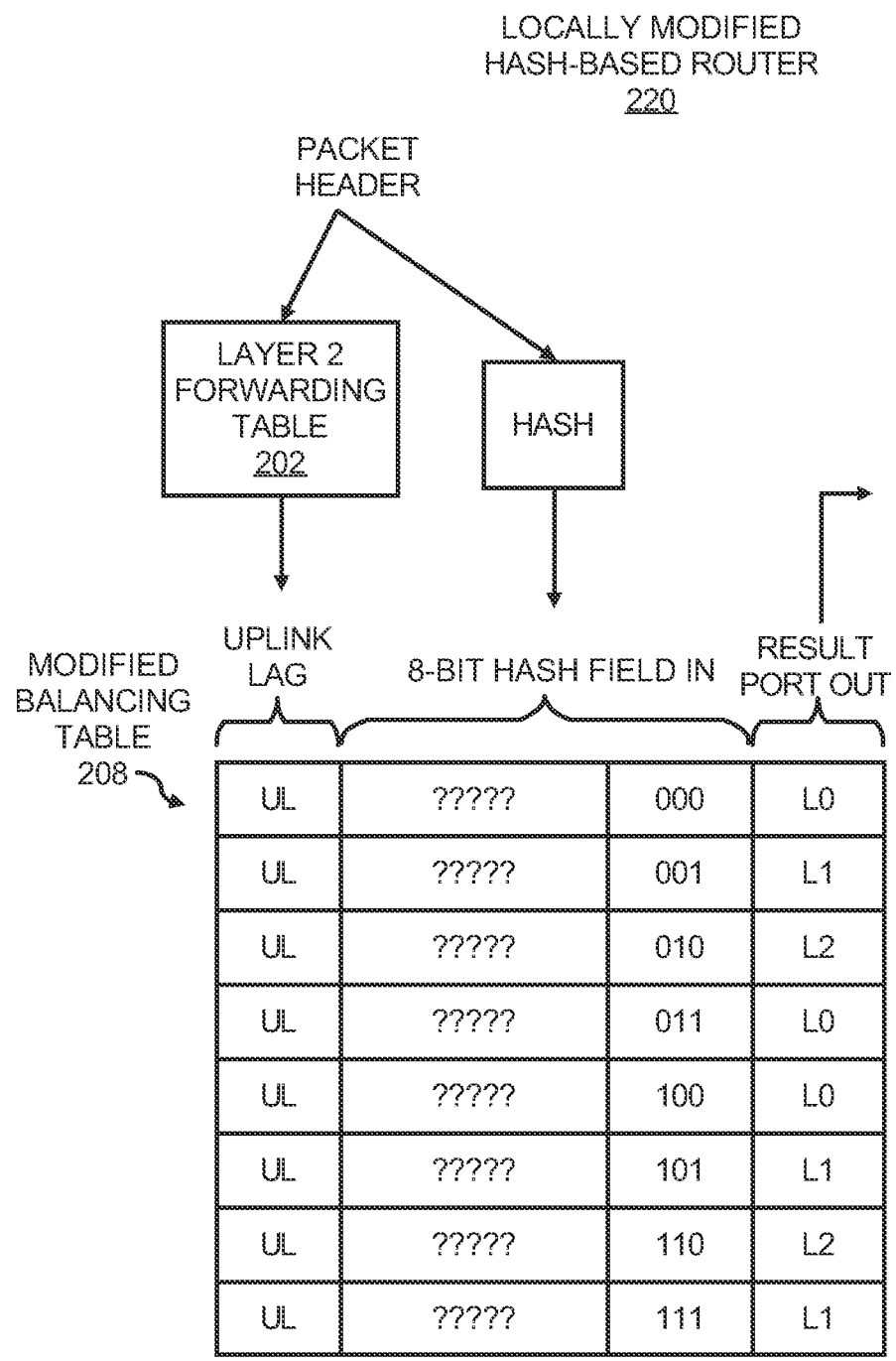
FIG. 2B shows a modified hash-based router for tolerating a failed link in a faulty leaf switch, according to an example embodiment of the present invention.

With particular reference now to FIG. 2B, there is shown a modified hash-based router 220 containing local modifications for a broken link, according to an example. In one embodiment, while no traffic can traverse the failed uplink, all leaf switches 120a-120n and all top switches 110a-110n remain in use even after one of the leaf switches 120a-120n and top switches 110a-110n has been determined to have a failed link. In order to accommodate the failed link in this embodiment, new balancing table 208 entries with local modifications are calculated to reroute packet traffic around the failed link. For the failed leaf switch, for instance, leaf switch 120n, no packet may be sent or received through the uplink marked as L3 (FIG. 1). Since the hash-based routing tables for the failed leaf switch directly controls packets that are sent through the failed link, only minor local modifications to the balancing table 208 shown in FIG. 2A may be needed to tolerate for the failed uplink.

The balancing table 204 shown in FIG. 2A has two entries (hash low order bits "011" and "111") that specify failed uplink L3 as the desired uplink. In the balancing table 208 shown in FIG. 2B, each of these entries has been modified and all of the traffic with low order hash "011" is depicted as being sent through link L0 while traffic with low order hash "111" is depicted as being sent through link L1. These two changes may reroute all of the packets that are sent on an uplink out of the failed leaf switch 120n around the failed uplink L3.

Figure 2C:
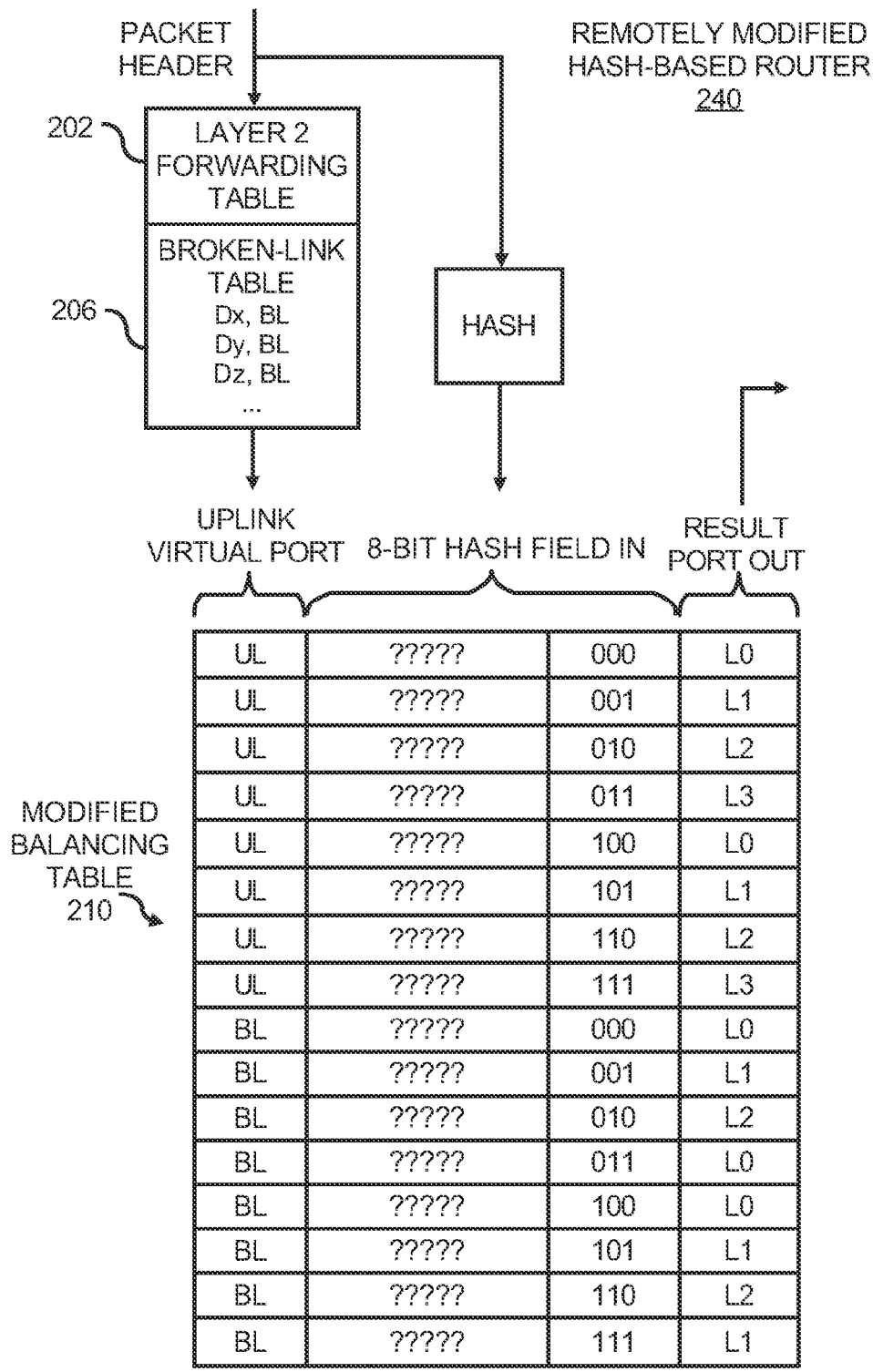
FIG. 2C shows a modified hash-based router for tolerating a failed link in a faulty leaf switch, according to an example embodiment of the present invention.

Turning now to FIG. 2C, there is shown a modified hash-based router 240 containing a remote modification for a broken link, according to another example. In one embodiment, in order to continue to use the failed top switch, for instance, top switch 110n (FIG. 1) that is connected to the failed uplink, each remote leaf switch identifies Ethernet destination addresses for devices that are attached to downlinks on the failed leaf switch. Packets sent to these addresses should avoid the failed top switch because the packets may reach a dead end at the failed uplink. In one example, from a remote leaf switch, other destination addresses may be sent to any top switch including the failed top switch, thus allowing the use of the failed top switch to send packets to destinations that are not attached to the failed leaf switch.

FIG. 2C illustrates changes needed in remote leaf switches to both the Layer two forwarding table 202 as well as a modified balancing table 210 in order to correctly route traffic around the failed uplink while retaining use of the failed top switch and the faulty leaf switch. In FIG. 2C, the Layer two forwarding table 202 is augmented with a broken-link table 206 that enumerates destination addresses for devices that are connected to the failed leaf switch. In one embodiment, for every device that is connected to the failed or broken leaf switch, a mechanism is required to create an entry in the broken-link table within every remote switch. This entry associates the specific device address (e.g., Dx) with a virtual port broken link ("BL") known as the virtual port for the broken switch (or failed switch). Thus, for each leaf switch, if the packet destination address is not attached to the failed leaf switch, the normal learning process tags its uplink destinations with uplink ("UL"). If the packet destination address is for a device attached to the failed destination switch, special processing that uses the broken link table may tag its uplink destinations with "BL". In another embodiment, the broken-link table 206 processing using an unmodified layer two forwarding table may be implemented by pinning those specific addresses in the standard table and setting their uplink as "BL".

In one embodiment, the balancing table 210 may also be augmented. The augmented balancing table 210 contains the unmodified normal balancing table, such as the balancing table 204 shown in FIG. 2A for any packets that are marked with the "UL" uplink virtual port tag, which indicates that they are not attached to the failed leaf switch. These packets may be routed to any of the four top switches as none of this traffic will attempt to traverse the failed uplink. In addition, newly created entries may use the BL tag to route packets that are bound for destinations that are attached to the failed leaf switch. These entries contain result port assignments, such as the modified balancing table 210 shown in FIG. 2B that may avoid the use of the failed top switch, as the use of this switch for destinations with the "BL" tag would result in an illegal use of the failed uplink.

Figure 3:
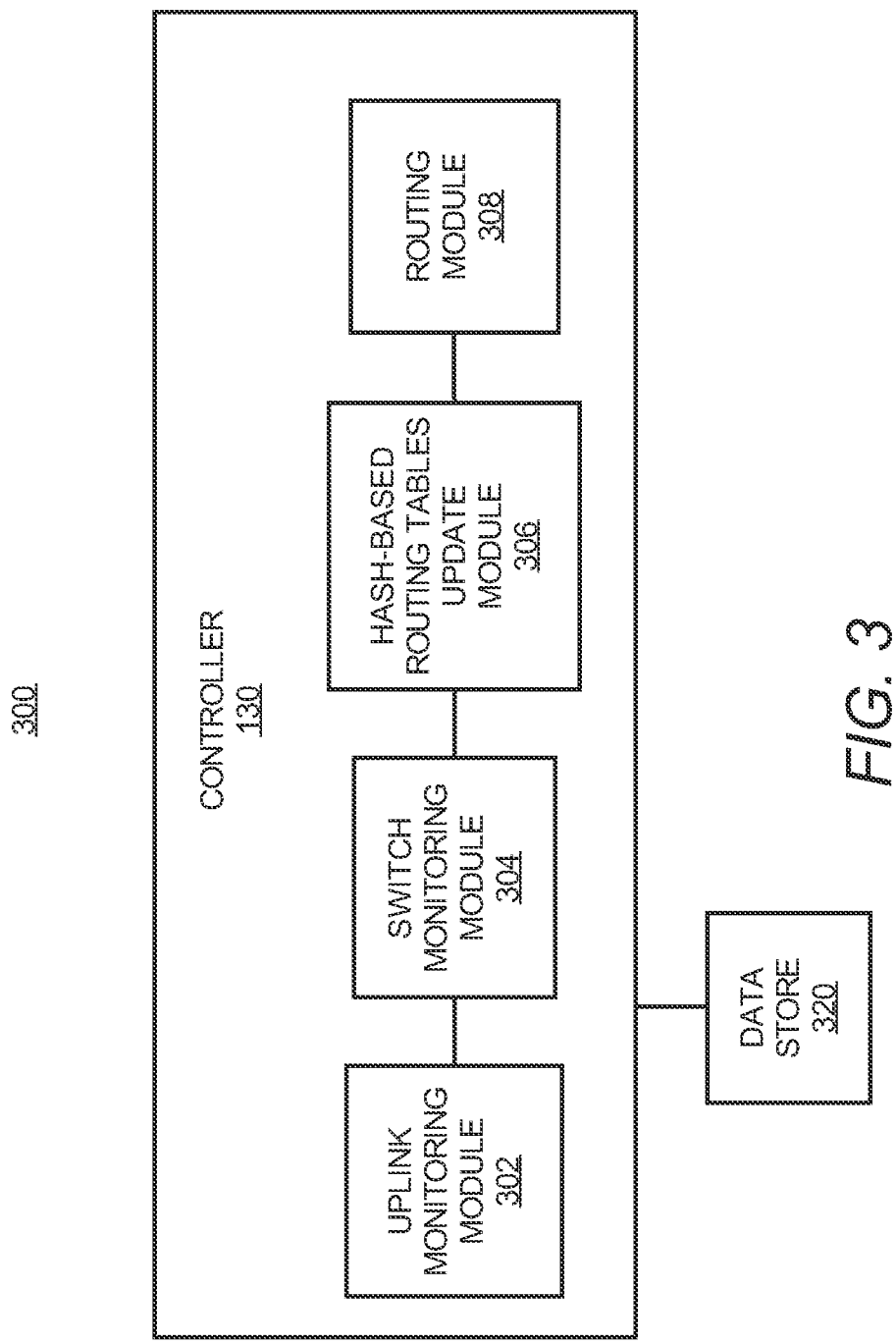
FIG. 3 illustrates a simplified block diagram of the controller depicted in FIG. 1, according to an example embodiment of the present invention.

With particular reference now to FIG. 3, there is shown a simplified block diagram 300 of the controller 130 depicted in FIG. 1, according to an example. It should be apparent to those of ordinary skill in the art that the block diagram 300 of the controller 130 represents a generalized illustration and that other components may be added or existing components may be removed, modified or rearranged without departing from a scope of the controller 130.

As shown in FIG. 3, the controller 130 includes an uplink monitoring module 302, a switch monitoring module 304, a hash-based routing tables update module 306, and a routing module 308. The modules 302-308 may comprise software modules, hardware modules, or a combination of software and hardware modules. Thus, in one embodiment, one or more of the modules 302-308 comprise circuit components. In another embodiment, one or more of the modules 302-308 comprise software code stored on a computer readable storage medium, which is executable by a processor.

The controller 130 may also be in communication with a data store 320, which may comprise any reasonably suitable memory from which the controller 130 may retrieve data. Although the data store 320 has been depicted as forming a separate component from the controller 130, it should be understood that the data store 320 may be integrated with the controller 130 without departing from a scope of the controller 130.

Figure 4:
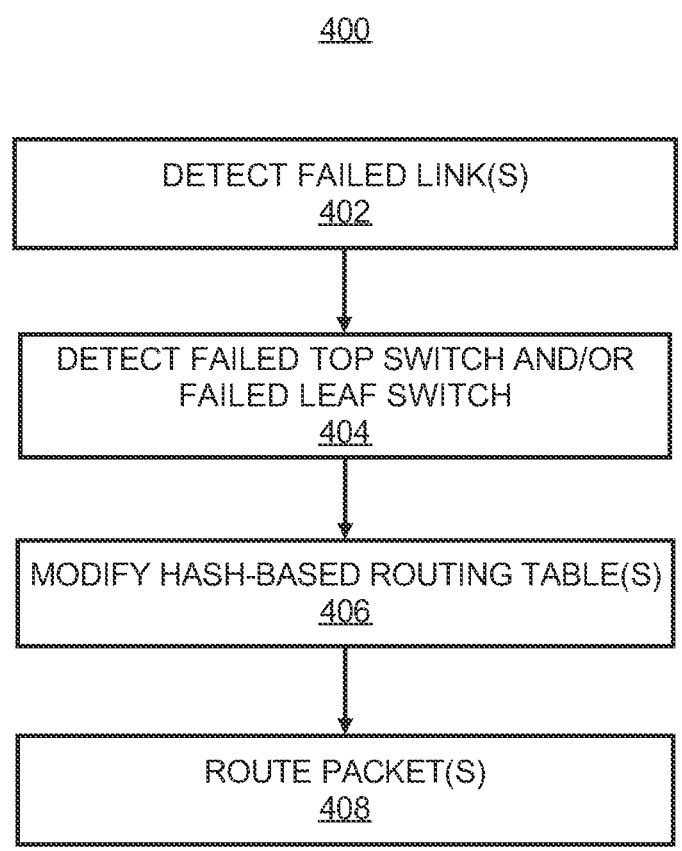
FIG. 4 illustrates a flow diagram of a method for routing packets in a fat tree network, according to an example embodiment of the present invention.

Various manners in which the modules 302-308 of the controller 130 may be implemented are described in greater detail with respect to FIG. 4, which depicts a flow diagram of a method 400 for routing packets between a plurality of top switches and a plurality of leaf switches using hash-based routing tables in a fat tree network, according to an example. It should be apparent to those of ordinary skill in the art that the method 400 represents a generalized illustration and that other steps may be added or existing steps may be removed, modified or rearranged without departing from a scope of the method 400.

The description of the method 400 is made with particular reference to the controller 130 depicted in FIG. 1 and thus makes particular reference to the elements contained in the controller 130. It should however, be understood that the method 400 may be implemented in an apparatus that differs from the controller 130 without departing from a scope of the method 400.

At step 402, a failed link between at least one top switch 110a-110n and at least one leaf switch 120a-120n is detected, for instance, by the uplink monitoring module 302. In one embodiment, at step 402, the uplink monitoring module 302 determines a LAG, which is a set of physical links that interconnect a pair of switches. In this embodiment, each physical link within a LAG connects each leaf switch to a top switch and each physical link in the LAG is attached to the same top switch. As shown in FIG. 1, four physical links that are aggregated and treated as a single virtual link within a LAG are attached to the top switch 110a. Each of the four different physical links connects a different leaf switch 120a-120n to the top switch 110a. A LAG is operable when any physical link within the LAG continues to operate and a LAG is considered to have failed when all physical links within the LAG have failed. With reference to FIG. 1, the uplinks depicted therein are the LAGs and the labels "L0", etc., reference a virtual link corresponding to that LAG. Each virtual link is attached to a switch and a corresponding virtual port that identifies the set of physical ports that attach to the physical links within the LAG. The downlinks may also be considered as LAGs.

The entries in the forwarding tables 202 and the balancing tables 204, 208, 210 shown in FIGS. 2A, 2B, and 2C, may all reference a virtual port that corresponds to one endpoint of a LAG. The balancing table 204, 208, 210 determines which LAG to send data on. The lower link aggregation layer then decides on which physical link within the LAG that the data is sent.

According to an example, at step 402, a determination as to whether the LAG includes a failed uplink is made, for instance, by the uplink monitoring module 302. If the LAG includes the failed uplink, one or more packets may be routed between the top switch and the different leaf switches via the uplinks that are not failed in the LAG as discussed below.

At step 404, a determination as to which top switch 110a-110n and/or leaf switch 120a-120n is attached to the failed uplink is made, for instance, by the switch monitoring module 304.

At step 406, the balancing table 208, 210 is modified based on the detected failed link, for instance, by the hash-based routing tables update module 306. As discussed above, the balancing table 208, 210 includes an uplink virtual port indicating an uplink output port based on hash values for each of the packets. The hash values for each of the packets may be computed using a packet header of each of the packets. By way of example, each of the packets may be assigned to each of the plurality of uplinks based on the different hash values for each of the packets.

In one embodiment, at step 406, a local modification to the balancing table 208 within the failed leaf switch is performed, as shown in FIG. 2B. In another embodiment, remote modification to both the forwarding table 202 and the balancing table 210 for all the remote leaf switches is performed, as shown in FIG. 2C. As discussed above with respect to FIG. 2C, the remote modification may include the addition of failed link entries 206 into a remote forwarding table 202 that specify that specific destination addresses are to be sent to the broken link (BL) (destination behind the broken switch) virtual port. The remote balancing table 210 may also be modified so that the entries that are sent to the BL virtual port are then matched in the remote balancing table and distributed across the top switches that have not failed.

According to an embodiment, at step 404, a determination as to which of the plurality of leaf switches 120a-120n is attached to the failed link is made. In one example of this embodiment, the balancing table 208 is modified by modifying the uplink output port associated with the failed link in the balancing table 208 of the determined leaf switch attached to the failed link, wherein the uplink output port associated with the failed link is modified to indicate a different uplink output port than the uplink output port associated with failed link. In another example of this embodiment, a forwarding table 202 of a remote leaf switch that is not attached to the failed link is constructed, a packet destination address for a packet from a device associated with the leaf switch attached to the failed uplink is determined and the balancing table 208 is modified by modifying the uplink virtual port and the uplink output port for the packet from the device associated with the leaf switch attached to the failed link, in which the modification does not route the packet from the device to the top switch attached to the failed uplink and integrating the forwarding table 202 of the remote leaf switch with the balancing table 208 having the modified uplink virtual port and the modified uplink output port for the packet from the device associated with the leaf switch attached to the failed link.

According to another embodiment, at step 404, a determination as to which of the plurality of top switches is attached to the failed link is made. In this embodiment, the at least one top switch determined to be attached to the failed link is disabled to thereby disable links attached to the determined at least one top switch. In addition, the balancing table 208 is modified to avoid use of the links in the at least one disabled top switch. In this embodiment, a determination as to whether the disabled top switch is a spanning tree top switch is made. In response to the at least one disabled top switch being a spanning tree top switch, a new spanning tree top switch is selected in the fat tree network and a spanning tree protocol is run using the new spanning tree top switch to generate a new spanning tree.

In the embodiments discussed above, one or both of the hash-based routing tables (forwarding table 202, balancing table 208, 210) may be modified at step 406 by modifying the uplink output port associated with the failed uplink in one or both of the hash-based routing tables. According to an example, the uplink output port associated with the failed uplink may be modified to indicate a different uplink output port than the uplink output port that is associated with the failed uplink, as discussed above with respect to FIGS. 2B and 2C. As shown therein and discussed above, for instance, the uplink virtual port and the uplink output port may be modified in the balancing table 208 so that the packet does not route from the device to the top switch attached to the failed uplink as shown in FIG. 2B. In another example, at step 406, the forwarding table 202 and the balancing tables 210 of all of the remote leaf switches are modified so that the uplink virtual port and the modified uplink output port for the packet from the device associated with the failed leaf switch attached to the failed uplink are integrated as shown in FIG. 2C.

At step 408, one or more packets are routed between the plurality of top switches 110a-110n and the plurality of leaf switches 120a-120n in the fat tree network 100 based on the modified hash-based routing tables, for instance, by the routing module 308. More particularly, for instance, if the LAG includes the failed uplink, one or more packets may be routed between the top switch and the different leaf switches via the uplinks that are not failed in the LAG as discussed above.

Some or all of the operations set forth in the figures may be contained as a utility, program, or subprogram, in any desired computer readable storage medium. In addition, the operations may be embodied by computer programs, which can exist in a variety of forms both active and inactive. For example, they may exist as software program(s) comprised of program instructions in source code, object code, executable code or other formats. Any of the above may be embodied on a computer readable storage medium, which include storage devices.

Exemplary computer readable storage devices include conventional computer system random access memory (RAM), read-only memory (ROM), erasable programmable read-only memory (EPROM), electrically erasable programmable read-only memory (EEPROM), and magnetic or optical disks or tapes. Concrete examples of the foregoing include distribution of the programs on a compact disc read only memory (CD ROM) or via Internet download. It is therefore to be understood that any electronic device capable of executing the above-described functions may perform those functions enumerated above.

Figure 5:
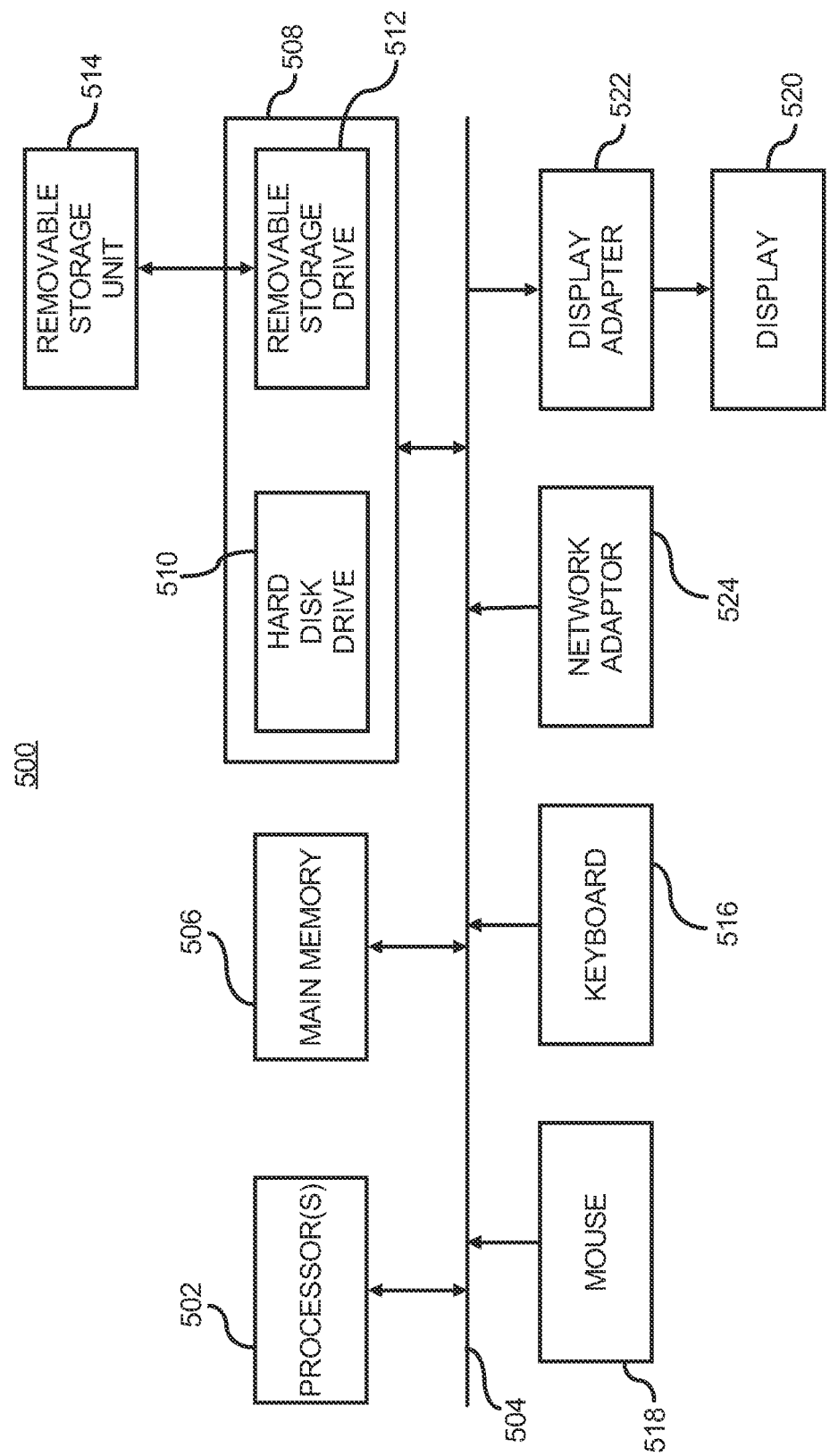
FIG. 5 shows a block diagram of a computing apparatus that may be used as a platform to implement or execute one or more of the processes depicted in FIG. 4, according to an example embodiment of the present invention.

FIG. 5 illustrates a block diagram of a computing apparatus 500 configured to implement or execute one or more of the processes depicted in FIG. 4, according to an embodiment. It should be understood that the illustration of the computing apparatus 500 is a generalized illustration and that the computing apparatus 500 may include additional components and that some of the components described may be removed and/or modified without departing from a scope of the computing apparatus 500.

The computing apparatus 500 includes a processor 502 that may implement or execute some or all of the steps described in one or more of the processes depicted in FIG. 4. For example, the processor 502 is configured to detect a failed between at least one top switch and at least one leaf switch, to modify the hash-based routing table(s) based on the detected failed link, and to route the packets between the plurality of top switches and the plurality of leaf switches in the fat tree network based on the modified hash-based routing table(s). Commands and data from the processor 502 are communicated over a communication bus 504. The computing apparatus 500 also includes a main memory 506, such as a random access memory (RAM), where the program code for the processor 502, may be executed during runtime, and a secondary memory 508. The secondary memory 508 includes, for example, one or more hard disk drives 510 and/or a removable storage drive 512, representing a floppy diskette drive, a magnetic tape drive, a compact disk drive, etc., where a copy of the program code for one or more of the processes depicted in FIG. 4 may be stored.

The removable storage drive 512 reads from and/or writes to a removable storage unit 514 in a well-known manner. User input and output devices may include a keyboard 516, a mouse 518, and a display 520. A display adaptor 522 may interface with the communication bus 504 and the display 520 and may receive display data from the processor 502 and convert the display data into display commands for the display 520. In addition, the processor(s) 502 may communicate over a network, for instance, the Internet, local area network (LAN), etc., through a network adaptor 524.

It will be apparent to one of ordinary skill in the art that other known electronic components may be added or substituted in the computing apparatus 500. It should also be apparent that one or more of the components depicted in FIG. 5 may be optional (for instance, user input devices, secondary memory, etc.).

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What have been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims and their equivalents in which all terms are mean in their broadest reasonable sense unless otherwise indicated.

What is claimed is:

1. A method for routing packets between a plurality of top switches and a plurality of leaf switches in a fat tree network, said method comprising:

detecting a failed link between at least one top switch and at least one leaf switch;

determining which of the plurality of leaf switches is attached to the failed link;

constructing a first balancing table of a remote leaf switch, wherein the remote leaf switch is not attached to the failed link;

modifying the first balancing table based on the detected failed link, wherein modifying the first balancing table includes:

updating an uplink virtual port and an uplink output port, which are based on hash values computed from a packet header for each of the packets, so that a packet associated with the failed leaf switch is not routed to the top switch through the failed link, and integrating the first balancing table with a second balancing table that is constructed for a remote leaf switch that is not attached to the failed link; and routing the packets between the plurality of top switches and the plurality of leaf switches in the fat tree network based on the modified first balancing table.

2. The method according to claim 1, wherein modifying the first balancing table further comprises modifying the uplink output port associated with the failed link in first balancing table of the leaf switch attached to the failed link, wherein the uplink output port associated with the failed link is modified to indicate a different uplink output port than the uplink output port associated with failed link.

3. The method according to claim 1, further comprising:
modifying a forwarding table of the remote leaf switch to include failed link entries that specify destination addresses are to be sent to a broken link virtual port.

4. The method according to claim 1, further comprising:
assigning each of the packets to each of the plurality of uplinks based on the hash values for each of the packets.

5. A method for routing packets between a plurality of top switches and a plurality of leaf switches using a balancing table in a fat tree network, said method comprising:

determining a top switch of the plurality of top switches that is attached to a failed link; and disabling the determined top switch to thereby disable links attached to the disabled top switch;

in response to the disabled top switch being a spanning tree top switch, selecting a new top switch to operate as the spanning tree top switch; and running a spanning tree protocol using the new spanning tree top switch to generate a new spanning tree; and modifying the balancing table to avoid use of the links in the disabled top switch based on the failed link, wherein the balancing table includes an uplink virtual port indicating an uplink output port based on hash values for each of the packets, and a packet destination address associated with one of the plurality of top switches for routing the packets, wherein the hash values for each of the packets are computed using a packet header of each of the packets; and routing the packets between the plurality of top switches and the plurality of leaf switches in the fat tree network based on the modified balancing table.

6. The method according to claim 1, further comprising:
routing the packets symmetrically through the fat tree network.

7. A computer-implemented controller for routing packets between a plurality of top switches and a plurality of leaf switches in a fat tree network, said computer-implemented controller comprising:

one or more modules configured to:
    detect a failed link between at least one switch and at least one leaf switch,
    determine which of the plurality of leaf switches is attached to the failed link;
    construct a first balancing table of a remote leaf switch, wherein the remote leaf switch is not attached to the failed link;
    modify the first balancing table based on the failed link, wherein to modify the first balancing table:
        update an uplink virtual port and an uplink output port, which are based on hash values computed from a packet header for each of the packets, so that a packet associated with the failed leaf switch is not routed to the top switch through the failed link, and
        integrate the first balancing table with a second balancing table that is constructed for a remote leaf switch that is not attached to the failed link, and
    route the packets between the plurality of top switches and the plurality of leaf switches in the fat tree network based on the modified first balancing table; and
  a processor to implement the one or more modules in routing the packets.

8. The computer-implemented controller according to claim 7, wherein the one or more modules are to modify the uplink output port associated with the failed uplink in the first balancing table of the failed leaf switch, wherein the uplink output port associated with the failed uplink is modified to indicate a different uplink output port than the uplink output port associated with failed uplink.

9. The computer-implemented controller according to claim 7, wherein the one or more modules are to modify a forwarding table of the remote leaf switch to include failed link entries that specify destination addresses are to be sent to a broken link virtual port.

10. The computer-implemented controller according to claim 7, wherein the one or more modules are to:
    disable the determined top switch attached to the failed link to thereby disable links attached to the determined top switch, and
    modify the first balancing table to avoid use of the links in the disabled top switch.

11. The computer-implemented controller according to claim 10, wherein the one or more modules are to:
    determine whether the disabled top switch is a spanning tree top switch,
    select a new top switch to operate as the spanning tree top switch in response to the disabled top switch being a spanning tree top switch, and
    run a spanning tree protocol using the new spanning tree top switch to generate a new spanning tree.

12. A non-transitory computer readable storage medium for routing packets between a plurality of top switches and a plurality of leaf switches using a balancing table in a fat tree network, including machine readable instructions executable by a processor to:
    detect a failed link between at least one top switch and at least one leaf switch;
    disable the at least one top switch attached to the failed link;
    in response to the disabled top switch being a spanning tree top switch,
        select a new top switch to operate as the spanning tree top switch; and
        run a spanning tree protocol using the new spanning tree top switch to generate a new spanning tree;
    modify the balancing table to avoid use of the links in the disabled top switch based on the detected failed link, wherein the balancing table includes an uplink virtual port indicating an uplink output port based on hash values for each of the packets, and a packet destination address associated with one of the plurality of top switches for routing the packets, wherein the hash values for each of the packets are computed using a packet header of each of the packets; and
    route the packets between the plurality of top switches and the plurality of leaf switches in the fat tree network based on the modified balancing table.

\* \* \* \* \*